US012527295B2

(12) United States Patent
Wang

(10) Patent No.: US 12,527,295 B2
(45) Date of Patent: Jan. 20, 2026

(54) ROTARY INDIVIDUALLY VENTILATED CAGE SYSTEM

(71) Applicant: Suzhou Houhuang Animal Laboratory Equipment Technology Co., Ltd., Suzhou (CN)

(72) Inventor: Shuxin Wang, Suzhou (CN)

(73) Assignee: Suzhou Houhuang Animal Laboratory Equipment Technology Co., Ltd., Suzhou (CN)

( * ) Notice: Subject to any disclaimer, the term of this patent is extended or adjusted under 35 U.S.C. 154(b) by 50 days.

(21) Appl. No.: 18/695,116

(22) PCT Filed: Apr. 18, 2023

(86) PCT No.: PCT/CN2023/089014
§ 371 (c)(1),
(2) Date: Mar. 25, 2024

(87) PCT Pub. No.: WO2023/231619
PCT Pub. Date: Dec. 7, 2023

(65) Prior Publication Data
US 2024/0389545 A1  Nov. 28, 2024

(30) Foreign Application Priority Data

May 31, 2022 (CN) .......................... 202210611785.0

(51) Int. Cl.
*A01K 1/00* (2006.01)
*A01K 1/03* (2006.01)
(52) U.S. Cl.
CPC ............ *A01K 1/0047* (2013.01); *A01K 1/031* (2013.01)

(58) Field of Classification Search
CPC ........ A01K 1/0047; A01K 1/031; A01K 1/03; A01K 1/032; A01K 1/033; A01K 1/034; A01K 1/035; A01K 1/0353; A01K 1/0356; A01K 1/0052; A01K 1/0058; A01K 1/0064; A01K 1/007; A01K 1/0076; A01K 1/0082
(Continued)

(56) References Cited

U.S. PATENT DOCUMENTS 4,448,150 A * 5/1984 Catsimpoolas ........ A01K 1/031
250/221
4,535,601 A * 8/1985 Newell, Jr. .......... A01K 1/0047
165/254
(Continued)

FOREIGN PATENT DOCUMENTS

CN  102119666 A * 7/2011

*Primary Examiner* — Zoe Tam Tran
(74) *Attorney, Agent, or Firm* — Wang Law Firm, Inc.

(57) ABSTRACT

Disclosed is a rotary individually ventilated cage system, including a cage holder and a plurality of rotary cages. The cage holder has an air supply pipeline and an air exhaust pipeline that are independent and nested with each other, and the cage holder is provided with a plurality of air supply ports in communication with the air supply pipeline and a plurality of air exhaust pipes in communication with the air exhaust pipeline. The plurality of rotary cages arranged on the cage holder, and each cage is in communication with one of the air supply ports and one of the air exhaust pipes. The air supply pipeline and the air exhaust pipeline are designed to be connected to a fresh-air supply and exhaust system.

11 Claims, 8 Drawing Sheets

(58) Field of Classification Search
USPC .......................................................... 119/416
See application file for complete search history.

(56) References Cited

U.S. PATENT DOCUMENTS

| | | | | |
|---|---|---|---|---|
| 5,865,144 | A * | 2/1999 | Semenuk | A01K 1/031 |
| | | | | 119/493 |
| 2007/0079765 | A1* | 4/2007 | Carter | A01K 1/031 |
| | | | | 119/456 |
| 2008/0282990 | A1* | 11/2008 | Conger | A01K 1/031 |
| | | | | 119/417 |
| 2009/0095697 | A1* | 4/2009 | Gabriel | A01K 1/031 |
| | | | | 211/206 |
| 2011/0005465 | A1* | 1/2011 | Tamborini | A01K 1/0047 |
| | | | | 119/419 |
| 2017/0339910 | A1* | 11/2017 | Heldt | A01K 29/00 |
| 2023/0046736 | A1* | 2/2023 | Tierney | A01K 1/031 |
| 2023/0277717 | A1* | 9/2023 | Jain | B01D 46/62 |
| | | | | 95/70 |

* cited by examiner

ROTARY INDIVIDUALLY VENTILATED CAGE SYSTEM

TECHNICAL FIELD

The present disclosure relates to the field of feeding equipment for laboratory animals and, more particularly, to a rotary IVC (individually ventilated cages) system.

BACKGROUND ART

In accordance with the national standard GB14925 Laboratory Animal-Requirements of Environment and Housing Facilities, the stocking and experimental environment for laboratory animals must reach an SPF level throughout the process. All laboratories have modified the experimental environment and built a barrier environment, but it is difficult to dynamically operate and maintain the barrier environment facilities, and very few laboratories can do so. In the 1990s, in some developed countries, the use of IVC (individually ventilated cages) greatly simplified the operating procedures in barrier environments. The humans are separated from the living environment of animals, allowing animals to enjoy SPF-level clean treatment in cages with purification levels above 10,000 and super clean benches with purification levels above 100. Moreover, this also saves animal keepers and experimenters of laboratories from the trouble of getting highly cleaned, prevents cross-infection among animals and between humans and animals effectively, and ensures the health and safety of experimental workers and keepers.

Thanks to the application of the IVC system, the original efforts to maintain a huge overall barrier environment are now reduced to only the normal operation of the IVC system, the cost required for the latter is only equivalent to 1/7 of the cost for the former. However, the heat, noise, vibration, and the like, generated during operation have a certain impact on laboratory animals; the cages occupy a relatively large area, and the breeding density is not high enough, resulting in still high costs.

In view of this, the applicant has proposed a central exhaust ventilation cages (EVC) system. Without affecting the quantity of cages that can be accommodated, this system greatly reduces the floor space of the cage holder, which thus increases the breeding density and reduces the feeding costs. However, the central exhaust ventilation cages (EVC) system can only discharge the dirty air from the cages, and the air entering the cages is still the natural air in the laboratory, which is problematic because natural air often carries various environmental factors that make it impossible for animal experiments or animal breeding to be conducted in a pure environment. This may affect the experimental effects or results, rendering them inaccurate.

The information disclosed in the Background Art section is merely intended to enrich the understanding of the general background of the present disclosure and should not be construed as an admission or in any way implying that the information constitutes prior art that is already known to a person of ordinary skill in the art.

SUMMARY OF THE INVENTION

It is an object of the present disclosure to provide a rotary IVC system that features a simple structure, a small footprint, and a high stocking density, and such a system may greatly reduce the impact of the external environment on the inner environment of the cage and improve the experimental accuracy.

To achieve the above object, embodiments of the present disclosure provide a rotary IVC system which includes a cage holder and cages.

The cage holder is provided with an air supply pipeline and air exhaust pipeline that are independent and nested with each other, and the cage holder is provided with a plurality of air supply ports in communication with the air supply pipeline and a plurality of air exhaust pipes in communication with the air exhaust pipeline. a plurality of rotary cages are arranged on the cage holder, and each of the cages is in communication with one of the air supply ports and one of the air exhaust pipes. The air supply pipeline and the air exhaust pipeline can respectively communicate with a fresh-air supply and exhaust system. During continuous operation of the fresh-air supply and exhaust system, air in the cages is continuously exhausted from the air exhaust pipeline to the fresh-air supply and exhaust system after passing through the air exhaust pipe, and clean air obtained from purification of the fresh-air supply and exhaust system is charged into the cages from the air supply port after passing through the air supply pipeline, so as to keep the air in the cages fresh and clean.

In one or more embodiments of the present disclosure, the cage holder includes a plurality of cage holder units, each cage holder unit including: a holder bottom surface for placing the cages thereon; and a holder side wall formed in the middle of the holder bottom surface and arranged to vertically pass through the holder bottom surface, wherein the holder side wall encloses to form an air cavity, and the air supply port is disposed on the holder side wall. The plurality of cage holder units are stacked in a vertical direction, and adjacent holder side walls are sealed and combined to form the air supply pipeline communicating the cage holder units.

In one or more embodiments of the present disclosure, independent air chambers are further formed in the air cavity enclosed by the holder side wall, the air chambers are connected to the holder side wall via the air exhaust pipe, and each of the air chambers is in sealed communication with an adjacent one of the air chambers to form the air exhaust pipeline communicating the cage holder units.

In one or more embodiments of the present disclosure, the rotary IVC system further includes a support tube, wherein the support tube is arranged to pass through a plurality of air chambers and is sealed with the air chambers, a plurality of air extraction holes are provided on the support tube corresponding to the air chambers, and the support tube cooperates with the air chambers to form the air exhaust pipeline.

In one or more embodiments of the present disclosure, a total area of the air extraction hole corresponding to each of the air chambers gradually decreases by 8% to 15%, preferably, by 10%, in an air extraction direction of the support tube. For example, in the air extraction direction of the support tube, a total area of an air extraction hole corresponding to an air chamber is $\pi \times 12$ cm2, and then a total area of an air extraction hole corresponding to a next air chamber is $0.9 \times \pi \times 12$ cm2, and so on.

In one or more embodiments of the present disclosure, the air extraction holes on the support tube become fewer in the direction of air extraction of the support tube.

In one or more embodiments of the present disclosure, the air extraction holes on the support tube become smaller in the direction of air extraction of the support tube.

In one or more embodiments of the present disclosure, a reinforcing rib is further provided between the air chamber and the holder side wall, the reinforcing rib including a tube portion that is at a lower end surface of the air chamber and around the support tube, and a plurality of rib portions extending from the tube portion toward the holder side wall.

In one or more embodiments of the present disclosure, the air chamber is provided with a sealing end cap formed with a through hole through which the support tube passes, and the sealing end cap seals the air chamber so that the air chamber is in fluid communication only with an interior of the support tube and the air exhaust pipe.

In one or more embodiments of the present disclosure, an upper end surface of the holder bottom surface is divided into a plurality of equal sections corresponding to the plurality of cages by a plurality of radially arranged raised bars, each equal section is provided therein with a sliding groove extending from an edge portion of the holder bottom surface to a central portion thereof and two fixing holes, and the sliding groove and the two fixing holes are distributed in a triangular pattern; a lower end of the cage is provided with a sliding rail and a fixing portion that cooperate respectively with the sliding groove and the fixing hole.

In one or more embodiments of the present disclosure, the holder side wall includes a first polygonal side wall formed on the upper end surface of the holder bottom surface and a second polygonal side wall formed on a lower end surface of the holder bottom surface, the first polygonal side wall and the second polygonal side wall are coaxially arranged, and each side of the first polygonal side wall cooperates with two adjacent raised bars.

In one or more embodiments of the present disclosure, a lower end of the second polygonal side wall of the holder bottom surface can be sealed and combined with an upper end of the first polygonal side wall of another holder bottom surface below the aforementioned holder bottom surface to form the air supply pipeline communicating the cage holder units.

In one or more embodiments of the present disclosure, the rotary IVC system further includes a cage frame for accommodating the cage holder, wherein the cage frame includes a bottom plate, a top plate, and a plurality of frame linings disposed between the top plate and the bottom plate, the cage holder is rotatably disposed within the cage frame, and a plurality of casters are fixedly provided on a lower end surface of the bottom plate.

In one or more embodiments of the present disclosure, the air extraction ports in communication with the air exhaust pipeline are provided on the top and bottom plates, air intake ports communicating with the air supply pipeline are provided on the top and bottom plates around the air extraction port, the air extraction port and air intake port are in communication with the fresh-air supply and exhaust system in the barrier environment via a cage frame fluid conduit having a quick plug connection, thereby forming a cage circulating fresh-air supply and exhaust system.

In one or more embodiments of the present disclosure, sealing rings and rotary shafts are provided at joints between a lower end surface of the top plate and an upper end surface of the cage holder corresponding to the air supply pipeline and the air intake port and a joint between the air exhaust pipeline and the air extraction port, and the rotary shafts are provided at joints on the bottom plate corresponding to the air exhaust pipeline and the air extraction port.

In one or more embodiments of the present disclosure, the plurality of air exhaust pipes are of equal lengths and diameters, and the plurality of air supply ports are of equal diameters.

Compared with the prior art, the rotary IVC system of the embodiments of the present disclosure features a simple structure, a small footprint, and a high stocking density, and has two non-interfering ventilation pipelines formed in the cage holder, with the cages respectively connected to the two ventilation pipelines and the two ventilation pipelines connected to the fresh-air supply and exhaust system in the barrier environment. As such, an internal circulation is formed among the fresh-air supply and exhaust system, the cage holder, and the cages, thereby extracting the dirty air from the cages and then sending same back into the cages. Such a system may greatly reduce the impact of the external environment on the inner environment of the cage and improve the experimental accuracy.

In the rotary IVC system of the embodiments of the present disclosure, the cage holder structure is strengthened by the support tube, and the air exhaust pipeline (for air extraction) is configured by communicating independent air chambers in the cage holder units with the support tube; the amount of air extracted through the support tube is kept constant by changing, specifically, reducing the total area of the air extraction holes corresponding to the air chambers by 8% to 15% along the air extraction direction of the support tube, so as to ensure that the traffic of dirty air extracted from the cages is consistent, which further controls the interference of influencing factors with the experiment. Specifically, for example, the amount of air extracted through the support tube is kept consistent by means of a gradually decreasing quantity of air extraction holes or a gradually decreasing inner diameter of the air extraction holes on the support tube along the air extraction direction, so as to ensure that the traffic of fresh air entering the cages is consistent, which further controls the interference of influencing factors with the experiment. Moreover, the independent air chambers in the cage holder units may also provide temporary storage and buffering of the dirty air extracted through the support tube, so as to further improve the accuracy of the amount of dirty air extracted from each cage.

In the rotary IVC system according to the embodiments of the present disclosure, there are more animals stocked per unit area, which makes more scientific and effective use of space, and costs less by two-thirds than the conventional IVC system. Many experimental entities that are unable to afford the high maintenance cost and have to accept poorer environmental conditions and lower requirements of experiments, with the rotary IVC system herein, may perform experiments under the nationally mandated experimental standards, which greatly improves the accuracy and reliability of experimental data.

DETAILED DESCRIPTION OF THE INVENTION

The specific embodiments of the present disclosure will be described in detail below with reference to the accompanying drawings, but it should be understood that the protection scope of the present disclosure is not limited by the specific embodiments.

Throughout this specification and the claims which follow, unless the context requires otherwise, the word "comprise", or variations such as "comprises" or "comprising", will be understood to imply the inclusion of a stated element or group of elements but not the exclusion of any other element or group of elements.

Figure 1:
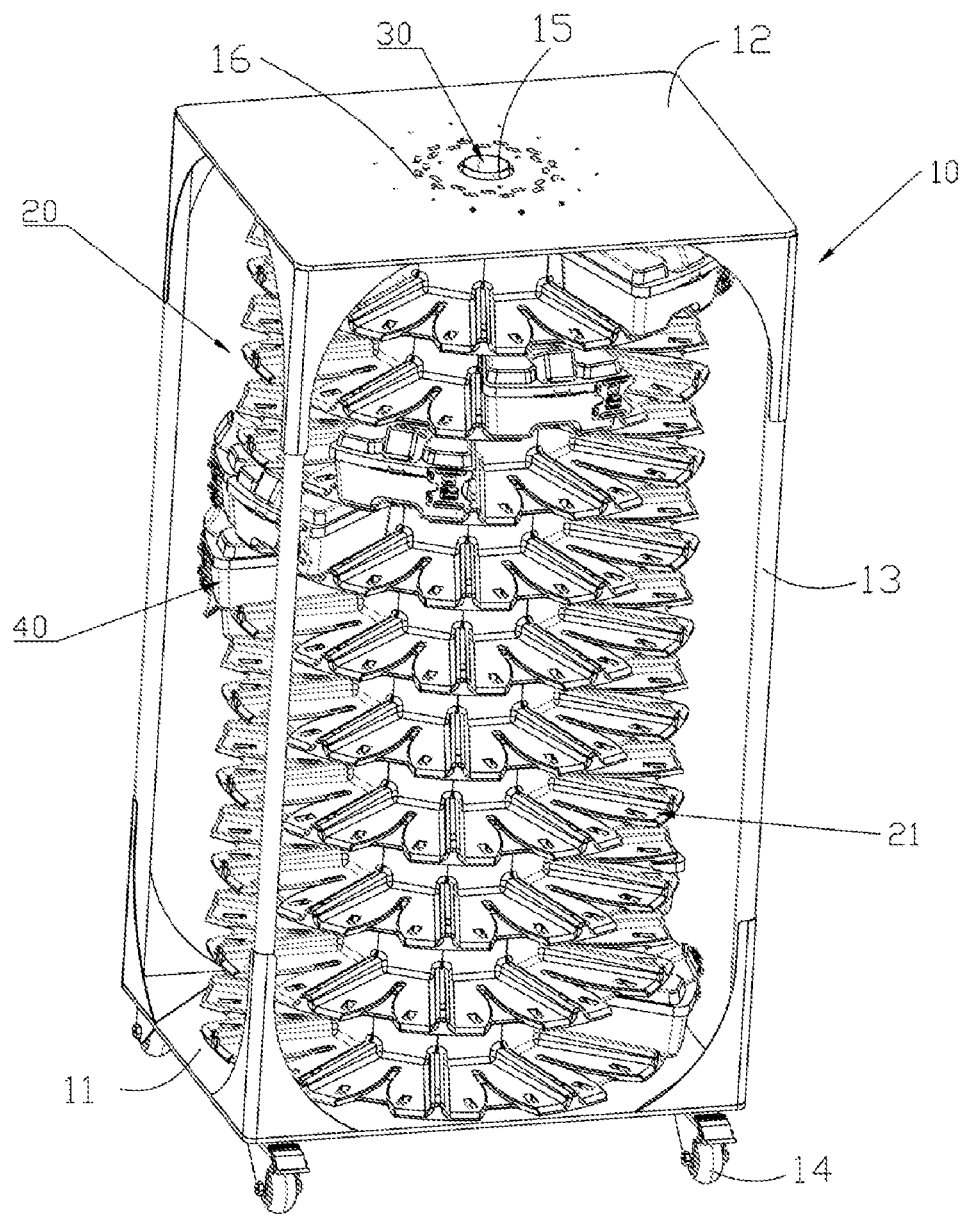
FIG. 1 is a perspective view of a rotary IVC system according to an embodiment of the present disclosure.
Figure 2:
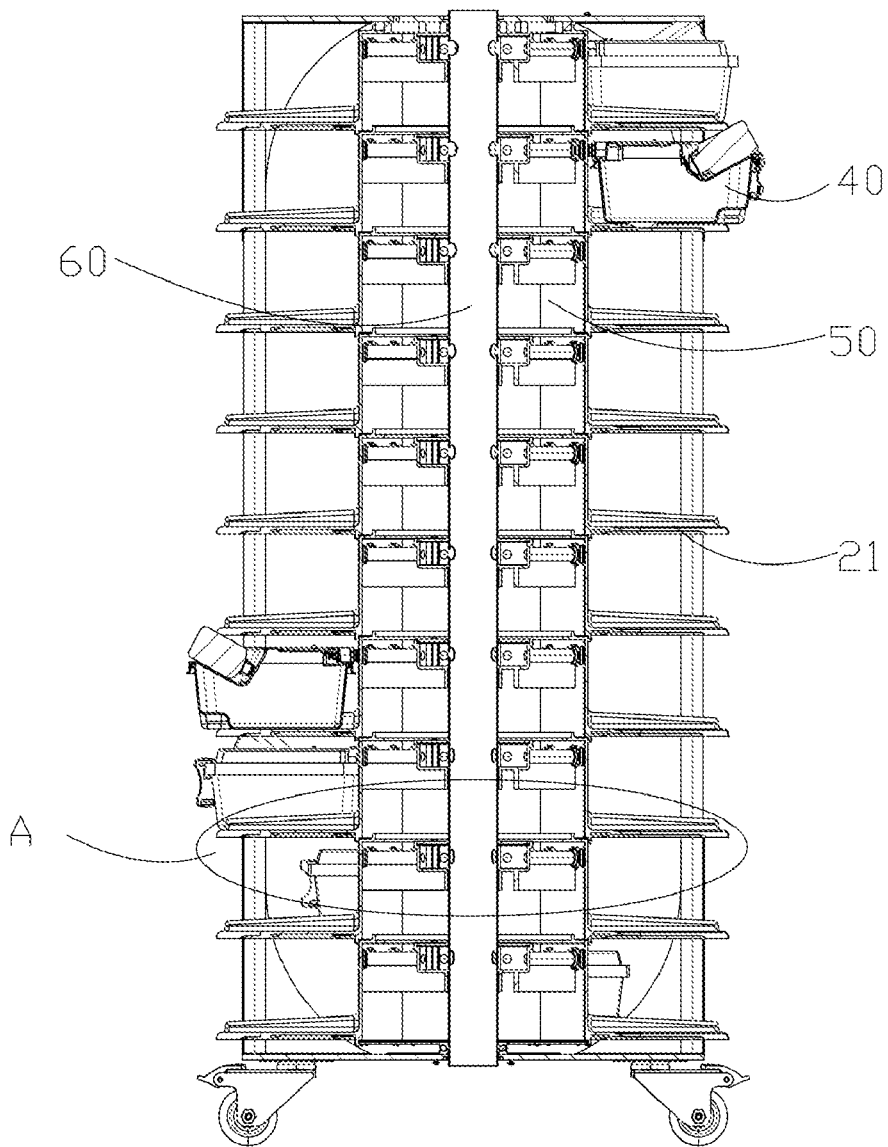
FIG. 2 is a cross-sectional view of the rotary IVC system according to an embodiment of the present disclosure.

As shown in FIGS. 1 and 2, a rotary IVC system according to an embodiment of the present includes a cage frame 10, a cage holder 20, a support tube 30, and cages 40. The cage holder 20 is arranged in the cage frame 10; the support tube 30 is longitudinally arranged through the cage frame 10 and the cage holder 20; a plurality of cages 40 are arranged on the cage holder 20. The cage holder 20 comprises a plurality of circular rotary cage holder units 21 arranged in a stacked manner, and a plurality of cages 40 can be placed in each cage holder unit 21.

The cage frame 10 may be made of 304 stainless steel. The cage frame 10 includes a bottom plate 11, a top plate 12 and four frame liners 13. The four frame liners 13 are distributed at four corners of the cage frame 10, and each has both ends fixedly connected to the bottom plate 11 and the top plate 12, respectively. The bottom plate 11 and the top plate 12 are provided with symmetrical air extraction ports 15, and on the top plate 12, air intake ports 16 are provided around the air extraction port 15. The air extraction port 15 and the air intake port 16 are respectively in communication with the fresh-air supply and exhaust system of the barrier environment via a cage frame fluid conduit having a quick plug connection, thereby forming a cage circulating fresh-air supply and exhaust system. Four castors 14 are fixedly connected at four corners of a lower end surface of the bottom plate 11.

As shown in FIGS. 4 to 7, in the present embodiment, the circular rotary cage holder unit 21 includes a holder bottom surface 211, which is configured to be a circular structure. An upper end surface of the holder bottom surface 211 is divided into ten equal sections by twenty raised bars 212 arranged radially, and a sliding groove 213 extending from an edge portion of the holder bottom surface to the central portion thereof is provided in each equal section, a groove width of the sliding groove 213 gradually decreasing in a direction towards the central portion of the holder bottom surface 211. Two fixing holes 214 are further provided on both sides of the sliding groove 213 on the holder bottom surface 211 in each equal section, and a through hole 215 is also provided at a narrower end of the sliding groove 213; a sliding rail cooperating with the sliding groove 213 and a fixing portion 44 cooperating with the fixing hole 214 are provided on a lower end surface of each cage 40; a engaging portion 43 is provided at a front end of the sliding rail; the cooperation of the sliding rail and the sliding groove 213, the cooperation of the fixing portion 44 and the fixing hole 214, and the cooperation of the engaging portion 43 and the through hole 215 can enable a stable triangular fixing structure between the cage 40 and the holder bottom surface 211, so as to prevent the cage 40 from tilting or loosening, as shown in FIG. 8. In other embodiments, the sliding rail may not be provided, and the engaging portion 43 may be directly configured as a strip-shaped rail structure that functions as the sliding rail.

Figure 3:
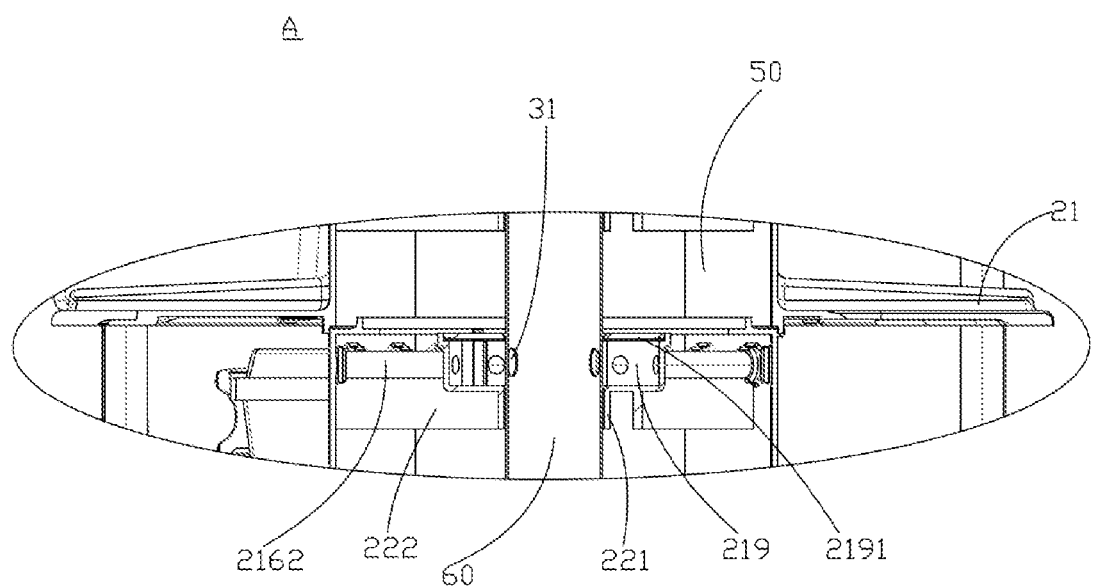
FIG. 3 is an enlarged detail view of portion A of FIG. 2.

A first polygonal side wall 216 of a decagon shape and a second polygonal side wall 217 of a decagon shape are coaxially provided at the central portions of the upper and lower end surfaces of the holder bottom surface 211, respectively. The first polygonal side wall 216 and the second polygonal side wall 217 have coaxial centers and penetrate the holder bottom surface 211 vertically. The first polygonal side wall 216 and the second polygonal side wall 217 form a holder side wall of the cage holder unit 21. The holder side wall forms an air cavity 218. Herein, when a plurality of cage holder units 21 are stacked in a vertical direction, adjacent holder side walls are sealed and combined (a lower end of the second polygonal side wall 217 of the upper holder bottom surface 211 may be sealed and combined with an upper end of the first polygonal side wall 216 of another holder bottom surface 211 below the aforementioned holder bottom surface 211), so that the plurality of air cavities 218 are nested up and down to form an air supply pipeline 50 communicating the cage holder units 21, as shown in FIGS. 2 and 3.

Each side of the first polygonal side wall 216 cooperates with two adjacent raised bars 212 as described above, and a height of the first polygonal side wall 216 is determined by a height of a matching cage 40. The lower end of the second polygonal side wall 217 may be sealed and combined with the upper end of the first polygonal side wall 216 of the adjacent holder bottom surface 211, so as to, on the one hand, stack and fix adjacent cage holder units 21 in the vertical direction, which avoids collapse, and on the other hand, form the air supply pipeline 50 communicating the cage holder units 21. To further enhance the stability of the cage holder 20, the lower end of the second polygonal side wall 217 is sealed and combined with the upper end of the first polygonal side wall 216 of the adjacent holder bottom surface 211 and may be then further fixed by screws.

In other embodiments, a quantity of raised bars 212 may be varied as desired, and accordingly, a quantity of sides of the first polygonal side wall 216 and the second polygonal side wall 217 may be varied to correspond to the raised bars 212.

An air supply port 2161 is provided on each side of the first polygonal side wall 216, the air supply port 2161 is in communication with the air supply pipeline 50 and is used for supplying purified gas into the cage 40 in cooperation with the external fresh-air supply and exhaust system, and the diameters of the plurality of air supply ports 2161 are identical. An air exhaust pipe 2162 is further provided on each side of the first polygonal side wall 216, and the air exhaust pipe 2162 is used for extracting dirty gas from the cage 40 in cooperation with the external fresh-air supply and exhaust system.

Figure 4:
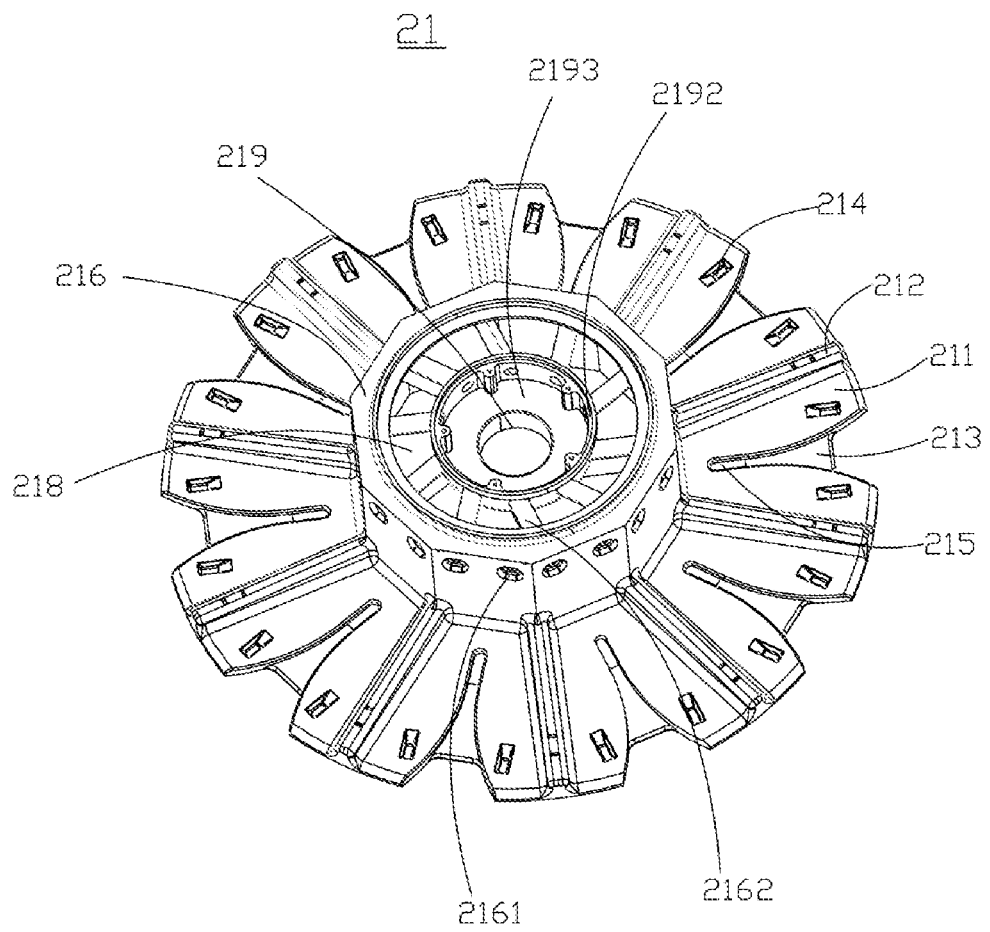
FIG. 4 is a perspective view of a cage holder unit in the rotary IVC system according to an embodiment of the present disclosure.
Figure 5:
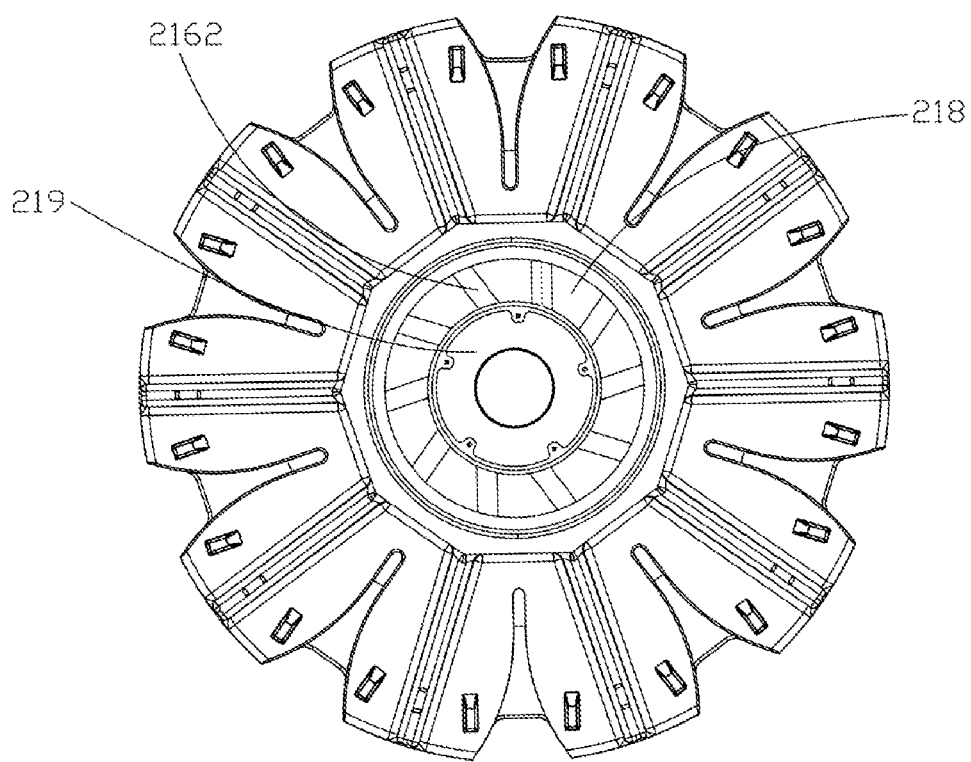
FIG. 5 is a top view of the cage holder unit in the rotary IVC system according to an embodiment of the present disclosure.
Figure 6:
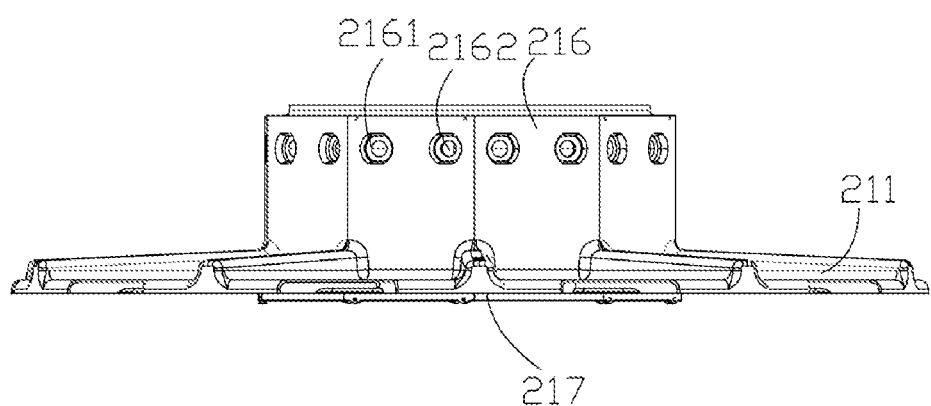
FIG. 6 is a side view of the cage holder unit in the rotary IVC system according to an embodiment of the present disclosure.

Independent air chambers 219 are also formed in the air cavities 218 enclosed by the holder side wall, and the air chamber 219 is connected to the holder side wall via the air exhaust pipe 2162. Where the cage holder units 21 are stacked, each air chamber 219 is in sealed communication with an adjacent air chamber 219 to form an air exhaust pipeline 60 communicating the cage holder units 21. The air exhaust pipeline 60 and the air supply pipeline 50 are coaxially nested and independent of each other, and a diameter of the air exhaust pipeline 60 is much smaller than a diameter of the air supply pipeline 50. The plurality of air exhaust pipes 2162 communicate with the air exhaust pipeline 60 and the cages 40, and the plurality of air exhaust pipes 2162 have equal lengths and diameters, as shown in FIGS. 2 and 4.

As shown in FIGS. 2 and 3, the support tube 30 is provided to penetrate the plurality of air chambers 219, the top plate 12, and the bottom plate 11, and is in sealed connection with the air chambers 219 and rotatable connection with the air extraction ports of the top plate 12 and the bottom plate 11. A plurality of air extraction holes 31 are provided on the support tube 30 corresponding to the air chambers 219, and the support tube 30 cooperates with the air chambers 219 to form the air exhaust pipeline 60. Upper or lower ends of the support tube 30 may be in communication with the fresh-air supply and exhaust system of the barrier environment via the cage frame fluid conduit having a quick plug connection (in communication with an air exhaust channel of the fresh-air supply and exhaust system) through the air extraction port 15, thereby extracting dirty air from the cages 40. The support tube 30 is provided to strengthen the structure of the cage holder and improve the stability thereof. Moreover, to ensure that the traffic of the dirty air extracted from the cages 40 is consistent and further control the interference of influencing factors with the experiment, the total area of the air extraction hole 31 corresponding to each air chamber 219 is gradually reduced by 8% to 15%, preferably, by 10%, along the air extraction direction of the support tube 30.

For example, in a specific embodiment, this may be achieved by gradually reducing the quantity of the air extraction holes 31 on the support tube 30 in the air extraction direction of the support tube 30 and/or gradually reducing the size of the air extraction holes 31 on the support tube 30 in the air extraction direction of the support tube 30.

For another example, in the air extraction direction of the support tube 30, The total area of an air extraction hole 31 corresponding to an air chamber 219 is π×12 cm2, and then THE total area of an air extraction hole 31 corresponding to a next air chamber 219 is 0.9×π×12 cm2, and so on.

As shown in FIG. 3, the air chamber 219 is composed of an annular inner side wall 2192, an inner bottom wall 2193, and a sealing end cover 2191, wherein the sealing end cover 2191 and the inner bottom wall 2193 are formed with a through hole, and the through-hole is used for penetrating the support tube 30 and is connected with the support tube 30 in a sealed manner by means of a sealing ring. The air exhaust pipe 2162 is arranged between the annular inner side wall 2192 and the holder side wall, and with a reinforcing rib 220, the air chamber 219 may be independently and stably located in the air cavity 218. The sealing end cap 2191 cooperates with the sealing ring to seal the air chamber 219 so that the air chamber 219 is in fluid communication only with the interior of the support tube 30 and the air exhaust pipe 2162. Where a plurality of cage holder units 21 are stacked in a vertical direction, adjacent holder side walls are sealed and combined, the air supply pipeline 50 is formed in the space between the holder side wall and the support tube 30 and between the holder side wall and the annular inner side wall 2192, and the air exhaust pipeline 60 is formed in the interior of the support tube 30 and the air chambers 219.

In other embodiments, the air chamber 219 may be composed of only the annular inner side wall 2192, and the height relationship between the annular inner side wall 2192 and the holder side wall is such that, when a plurality of cage holder units 21 are stacked in a vertical direction and adjacent holder side walls are sealed and combined, the adjacent annular inner side walls 2192 are also sealed and combined, and the support tube 30 is within the annular inner side wall 2192. In this case, the air supply pipeline 50 is formed in the space between the holder side wall and the annular inner side wall 2192, and the interior of the support tube 30 and the interior of the annular inner side wall 2192 are communicated to form the air exhaust pipeline 60. Alternatively, the support tube 30 may not be provided, and the interior of the annular inner side wall 2192 directly forms the air exhaust pipeline 60; in this case, how the diameter of the air exhaust pipe 2162 on each air chamber 219 changes is in line with how the diameter of the air extraction holes 31 on the support tube 30 changes, for example, the diameter of the air exhaust pipe 2162 gradually decreases in the air extraction direction.

Figure 7:
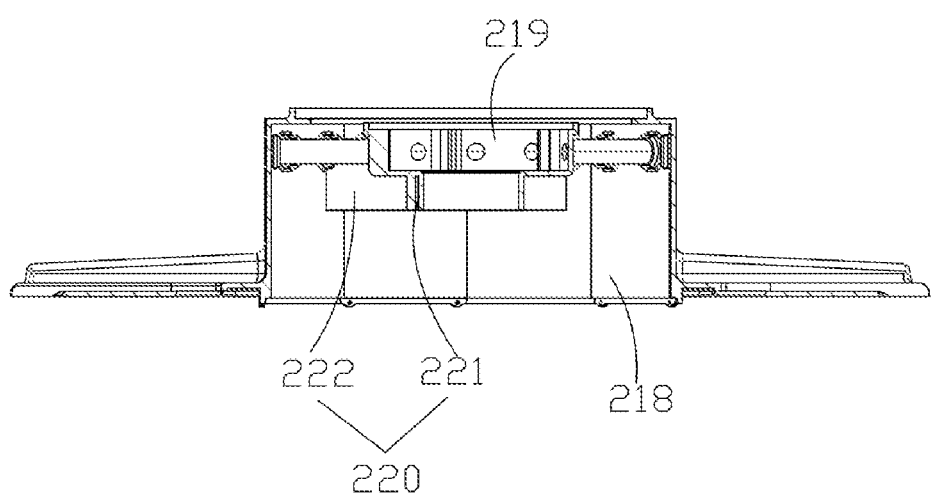
FIG. 7 is a cross-sectional view of the cage holder unit in the rotary IVC system according to an embodiment of the present disclosure.
Figure 8:
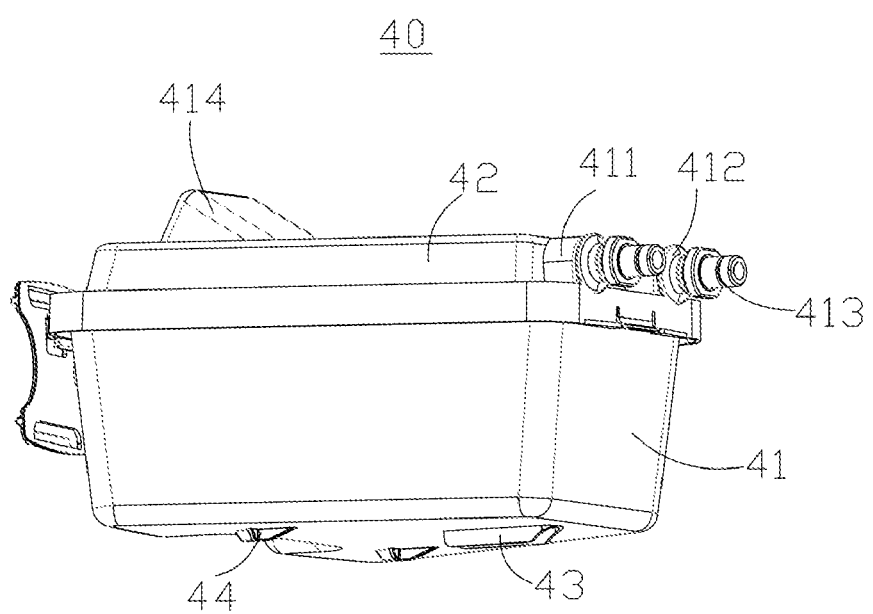
FIG. 8 is a structure of a cage in the rotary IVC system according to an embodiment of the present disclosure.

As shown in FIGS. 3 and 7, the reinforcing rib 220 is further provided between the air chamber 219 and the holder side wall, and the reinforcing rib 220 includes a tube portion 221 that is at the lower end face of the air chamber 219 and around the support tube 40, and a plurality of rib portions 222 extending from the tube portion 221 to the holder side wall.

Sealing rings and rotary shafts are provided at joints between a lower end surface of the top plate 12 and an upper end surface of the cage holder 20 corresponding to the air supply pipeline 50 and the air intake port 16 and a joint between the air exhaust pipeline 60 and the air extraction port 15. The sealing ring has the properties of wear resistance, high pressure resistance, and corrosion resistance. The rotary shaft is provided so that the cage holder 20 may rotate. The cage holder unit 21 at the bottom end is provided with a cap at the bottom thereof, and the cap may block the air supply pipeline 50. In this embodiment, the supply air line 50 is used for supplying air, and a second air extraction pipeline 60 is used for extracting air.

As shown in FIG. 8, the cage 40 includes a cage body 41 and a cage cover 42 in sealed engagement with the cage body 41. The cage 40 may be made of high-temperature polysulfone or PC plastic, which is highly resistant to acid, alkaline detergents, or steam sterilization, maintains strength even after repeated autoclaving, and thus has a long service life. Moreover, at an inner end of the cage 40, air ports 411 and 412 are provided, and an air guide pipe 413 made of rubber is provided on the air ports; the air guide pipe 413 may be inserted into the air supply port 2161 and the air exhaust pipe 2162 to realize the fluid communication between the cage 40 and the air supply pipeline 50 and between the cage 40 and the air exhaust pipeline 60.

In addition, the cage 40 is further provided with a drinking bottle 414 and a feeding box for animals, and apparently, an automatic drinking and feeding system may also be provided according to the requirements of practical applications.

In the rotary IVC system of the present disclosure, the air supply pipeline 50 and the air exhaust pipeline 60 may respectively communicate with the fresh-air supply and exhaust system in the barrier environment; with the fresh-air supply and exhaust system in continuous operation, air in the cages 40 is continuously exhausted from the air exhaust pipeline 60 to the fresh-air supply and exhaust system after passing through the air exhaust pipe 2162, and clean air obtained from purification of the fresh-air supply and exhaust system is charged into the cages 41 from the air supply port 2161 after passing through the air supply pipeline 50, so as to keep the air in the cages 41 fresh and clean.

Compared with the prior art, the rotary IVC system of the embodiments of the present disclosure features a simple structure, a small footprint, and a high stocking density, and has two non-interfering ventilation pipelines formed in the cage holder, with the cages respectively connected to the two ventilation pipelines and the two ventilation pipelines connected to the fresh-air supply and exhaust system in the barrier environment. As such, an internal circulation is formed among the fresh-air supply and exhaust system, the cage holder, and the cages, thereby extracting the dirty air from the cages and then sending same back into the cages. Such a system may greatly reduce the impact of the external environment on the inner environment of the cage and improve the experimental accuracy.

In the rotary IVC system of the embodiments of the present disclosure, the cage holder structure is strengthened by the support tube, and the air exhaust pipeline (for air extraction) is configured by communicating independent air chambers in the cage holder units with the support tube; the amount of air extracted through the support tube is kept constant by changing, specifically, reducing the total area of the air extraction holes corresponding to the air chambers by 8% to 15% along the air extraction direction of the support tube, so as to ensure that the traffic of dirty air extracted from the cages is consistent, which further controls the interference of influencing factors with the experiment. Specifically, for example, the amount of air extracted through the support tube is kept consistent by means of a gradually decreasing quantity of air extraction holes or a gradually decreasing inner diameter of the air extraction holes on the support tube along the air extraction direction, so as to ensure that the traffic of fresh air entering the cages is consistent, which further controls the interference of influencing factors with the experiment. Moreover, the independent air chambers in the cage holder units may also provide temporary storage and buffering of the dirty air extracted through the support tube, so as to further improve the accuracy of the amount of dirty air extracted from each cage.

In the rotary IVC system according to the embodiments of the present disclosure, there are more animals stocked per unit area, which makes more scientific and effective use of space, and costs less by two-thirds than the conventional IVC system. Many experimental entities that are unable to afford the high maintenance cost and have to accept poorer environmental conditions and lower requirements of experiments, with the rotary IVC system herein, may perform experiments under the nationally mandated experimental standards, which greatly improves the accuracy and reliability of experimental data.

The foregoing description of specific exemplary embodiments of the present disclosure has been presented for purposes of illustration and example. It is not intended to limit the disclosure to the precise form disclosed, and apparently many modifications and variations are possible in light of the above teaching. The exemplary embodiments are chosen and described in order to explain the specific principles of the disclosure and its practical application to enable one skilled in the art to make and use various exemplary embodiments of the disclosure as well as various alternatives and modifications. It is intended that the scope of the disclosure be defined by the claims and their equivalents.

What is claimed is:

1. A rotary individually-ventilated-cages (IVC) system, comprising:
a cage holder having an air supply pipeline and an air exhaust pipeline that are independent and nested with each other, and the cage holder is provided with a plurality of air supply ports in communication with the air supply pipeline and a plurality of air exhaust pipes in communication with the air exhaust pipeline; the cage holder comprising a plurality of cage holder units, each cage holder unit comprising: a holder bottom surface for placing the cages thereon; a holder side wall formed in the middle of the holder bottom surface and arranged to vertically pass through the holder bottom surface, wherein the holder side wall forms an air cavity, and the air supply port is disposed on the holder side wall; wherein the plurality of cage holder units are stacked in a vertical direction, and adjacent holder side walls are sealed and combined to form the air supply pipeline communicating the cage holder units; independent air chambers are formed in the air cavity enclosed by the holder side wall, the air chambers are connected to the holder side wall via the air exhaust pipe, and each of the air chambers is in sealed communication with an adjacent one of the air chambers to form the air exhaust pipeline communicating the cage holder units;
a plurality of rotary cages arranged on the cage holder, and each cage is in communication with one of the air supply ports and one of the air exhaust pipes; and
a support tube, wherein the support tube is arranged to pass through a plurality of air chambers and is sealed with the air chambers, a plurality of air extraction holes are provided on the support tube corresponding to the air chambers, and the support tube cooperates with the air chambers to form the air exhaust pipeline;
wherein the air supply pipeline and the air exhaust pipeline are designed to be connected to a fresh-air supply and exhaust system; wherein during the continuous operation of the fresh-air supply and exhaust system, air in the cages is continuously exhausted from the air exhaust pipeline to the fresh-air supply and exhaust system, and clean air obtained from purification of the fresh-air supply and exhaust system is supplied into the cages from the air supply port via the air supply pipeline, so as to keep the air in the cages fresh and clean; a total area of the air extraction hole corresponding to each of the air chambers gradually decreases by 8% to 15% in an air extraction direction of the support tube.

2. The rotary IVC system according to claim 1, wherein the air extraction holes on the support tube become fewer in the direction of air extraction of the support tube.

3. The rotary IVC system according to claim 1, wherein the air extraction holes on the support tube become smaller in the direction of air extraction of the support tube.

4. The rotary IVC system according to claim 1, wherein a reinforcing rib is further provided between the air chamber and the holder side wall, the reinforcing rib comprising a tube portion that is at a lower end surface of the air chamber and around the support tube, and a plurality of rib portions extending from the tube portion toward the holder side wall.

5. The rotary IVC system according to claim 1, wherein the air chamber is provided with a sealing end cap formed with a through hole through which the support tube passes, and the sealing end cap seals the air chamber so that the air chamber is in fluid communication only with an interior of the support tube and the air exhaust pipe.

6. The rotary IVC system according to claim 1, wherein an upper end surface of the holder bottom surface is divided into a plurality of equal sections corresponding to the plurality of cages by a plurality of radially arranged raised bars, each equal section is provided therein with a sliding groove extending from an edge portion of the holder bottom surface to a central portion thereof and two fixing holes, and the sliding groove and the two fixing holes are distributed in a triangular pattern; a lower end of the cage is provided with a sliding rail and a fixing portion that cooperate respectively with the sliding groove and the two fixing holes.

7. The rotary IVC system according to claim 6, wherein the holder side wall comprises a first polygonal side wall formed on the upper end surface of the holder bottom surface and a second polygonal side wall formed on a lower end surface of the holder bottom surface, the first polygonal side wall and the second polygonal side wall are coaxially arranged, and each side of the first polygonal side wall cooperates with two adjacent raised bars;

a lower end of the second polygonal side wall of the holder bottom surface can be sealed and combined with an upper end of the first polygonal side wall of another holder bottom surface below the aforementioned holder bottom surface to form the air supply pipeline communicating the cage holder units.

8. The rotary IVC system according to claim 1, further comprising a cage frame for accommodating the cage holder, wherein the cage frame comprises a bottom plate, a top plate, and a plurality of frame linings disposed between the top plate and the bottom plate, the cage holder is rotatably disposed within the cage frame, and a plurality of casters are fixedly provided on a lower end surface of the bottom plate.

9. The rotary IVC system according to claim 8, wherein air extraction ports in communication with the air exhaust pipeline are provided on the top and bottom plates, air intake ports communicating with the air supply pipeline are provided on the top plate around the air extraction port, the air extraction port and air intake port are in communication with the fresh-air supply and exhaust system in the barrier environment via a cage frame fluid conduit having a quick plug connection, thereby forming a cage circulating fresh-air supply and exhaust system.

10. The rotary IVC system according to claim 9, wherein sealing rings and rotary shafts are provided at joints between a lower end surface of the top plate and an upper end surface of the cage holder corresponding to the air supply pipeline and the air intake port and a joint between the air exhaust pipeline and the air extraction port, and the rotary shafts are provided at joints on the bottom plate corresponding to the air exhaust pipeline and the air extraction port.

11. The rotary IVC system according to claim 1, wherein the plurality of air exhaust pipes have equal lengths and diameters, and the plurality of air supply ports are of equal diameters.

* * * * *